Jan. 17, 1967   R. J. NICHOL   3,298,558
MOLDED LAMINATED ARTICLE
Filed Jan. 30, 1963
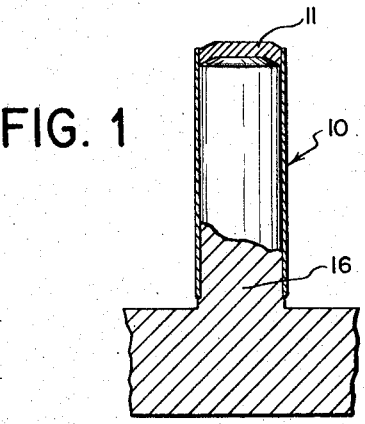
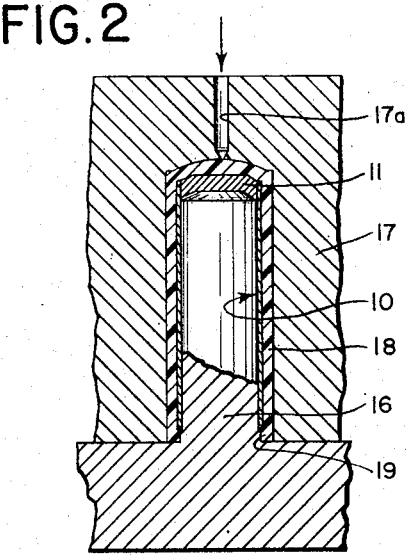
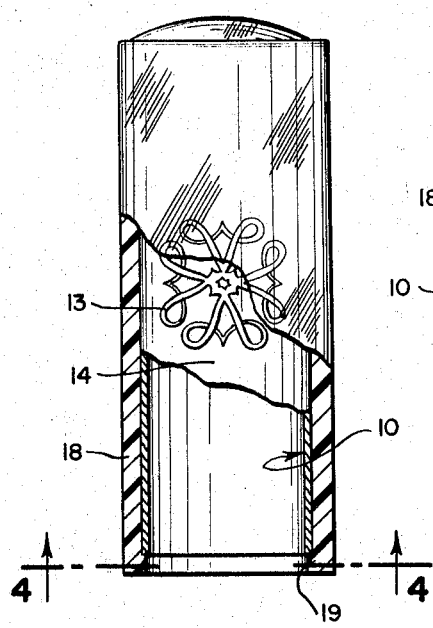
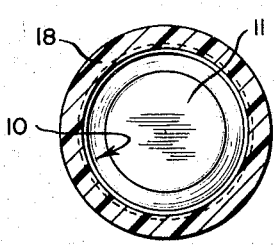
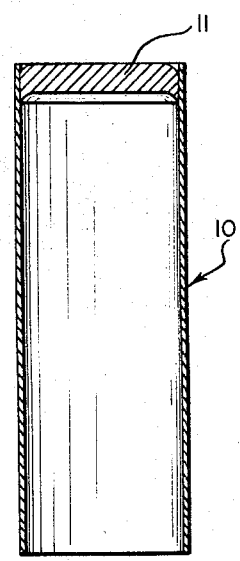
INVENTOR
Richard J. Nichol
BY Pennie, Edmonds, Morton,
Taylor and Adams
ATTORNEYS

United States Patent Office

3,298,558
Patented Jan. 17, 1967

3,298,558
MOLDED LAMINATED ARTICLE
Richard J. Nichol, Mount Kisco, N.Y., assignor to Avon Products, Inc., a corporation of New York
Filed Jan. 30, 1963, Ser. No. 255,046
5 Claims. (Cl. 220—63)

This invention relates to a process for molding laminated articles and the products thereof, and more particularly to a novel laminated plastic cover for lipstick holders and the like.

In accordance with the invention, a sleeve of a material such as paper, cardboard, or other similar fibrous material, or plastic, metal, and the like, is bonded during a molding process to a surrounding tubular casing of transparent plastic. The sleeve will be provided on its outer surface with a decorative design or plurality of such designs in color, so that the design will have the appearance, when viewed through the transparent outer casing, as an inlaid effect. Such effect may be heightened by embossing the design upon the sleeve which additionally provides an interlock between the sleeve-casing interface to assist the bond between two elements of the laminate.

Aside from the special artistic effects which may be achieved, the practice of the present invention permits the manufacturer of a great variety of durable covers for lipstick holders and the like, very inexpensively. Consequently, the invention is expected to find a ready mass market for the products thereof.

In the following description, reference is made, by a non-limiting example, to one form of construction of a laminated plastic cover devised in accordance with the molding process of the invention and illustrated by the accompanying drawing in which:

FIG. 1 is a fragmentary cross-sectional view illustrating a decorative cardboard sleeve or insert mounted upon a force plug prior to the plastic molding process;

FIG. 2 illustrates the molding process itself;

FIG. 3 is an enlarged fragmentary cross section of the representative finished product of the process of FIG. 2;

FIG. 4 is a cross section taken in the direction of arrows 4—4 of FIG. 3; and

FIG. 5 is an enlarged detail showing of the decorative insert or sleeve prior to the lamination thereof with an outer casing of transparent plastic.

Referring now to the drawing and initially to FIG. 5 thereof, a tubular sleeve 10 of cardboard, pressed paper, or the like, has been illustrated. The sleeve 10 has an end cap or closure member 11 at one end and is open at the opposite end.

As best seen in FIG. 3, the sleeve or insert 10 may be provided with a decorative design 13 upon the exterior cylindrical surface 14 thereof. The surface 14 may alternatively include designs such as a floral pattern, and may be in full color, or to heighten the effect of the design 13, white as a background color may be chosen. For a reason which will be discussed, the design 13 may be embossed upon the surface 14 of the sleeve 10.

Referring now to the sequence illustrated in FIGS. 1 and 2, the sleeve 10 is shown fitted upon a force plug 16 which together with the sleeve may be said to comprise the male portion of a molding die combination. In accordance with the invention, the plug 16 and sleeve 10 will be located within a female die member 17 such that a molding cavity is formed between the external surface of the sleeve and the internal wall surfaces of the die member 17. Furthermore, the die member 17 is provided with a sprue channel 17a which is adapted to communicate with a source of fluid plastic material (not shown) and the cavity defined between the respective members 17 and 10.

With the elements positioned as described, a quantity of clear plastic material such as thermoplastic material, for example, will be permitted to flow through the channel 17a to the interior of the die member 17 into surrounding adhering relationship with respect to the sleeve 10 to form after curing, a hardened transparent outer casing 18. During molding process, the casing 18 will become bonded to the exterior of the sleeve 10 along the sleeve-casing interface. As illustrated, the plastic will be permitted to flow beyond the end of the sleeve thereby forming a section 19 whose internal diameter is substantially the same as the internal diameter of the sleeve above the end to provide a flush continuous internal surface. After curing, the casing 18 and insert or sleeve 10 will be withdrawn from the die members 16 and 17 in the laminated form illustrated in FIG. 3.

As mentioned, during the molding process, the sleeve or insert 10 becomes bonded securely to the surrounding plastic casing, and this frictional interfit is assisted in two respects. By having the plastic flow about the end of the sleeve 10, any tendency for the insert 10 to be caught and peeled from the casing 18 when the cover is inserted over a lipstick holder will be obviated. Furthermore, if the design 13 be embossed (such as by the use of raised printing, for example) upon the surface of the sleeve, such raised area will form a structural interlock between the sleeve-casing interface. Advantageously, the molding process is carried out at a pressure of 10,000–12,000 pounds per square inch.

The product of the foregoing process is extremely inexpensive yet presents very attractive design effects, when seen through the outer laminated layer of transparent plastic, such as polystyrene, acrylic, or cellulosic material, and the like. The method of the invention permits the use of translucent plastics which are readily rendered opaque by the sleeve insert therein, while an outer clear layer of plastic provides a jeweled casing effect. It will be apparent also that the insert, though readily susceptible to wear or harmful deterioration upon its decorative surfaces is fully protected by the surrounding outer layer of durable plastic.

It will be understood that the foregoing description relates to a particular embodiment and is merely representative. Therefore, in order to fully appreciate the spirit and scope, reference should be made to the appended claims.

I claim:

1. A molded laminated article comprising an outer tubular casing, open at one end, of clear plastic material, an inner cylindrical sleeve bonded to said casing, said sleeve having a design upon the surface bonded to said casing and capable of being viewed through said casing.

2. A molded laminated article according to claim 1 in which said design is embossed by raised printing upon the cylindrical outer surface of said sleeve to form a structural interlock with said plastic and to heighten the effect of said design as inlaid within the plastc casing.

3. A molded laminated lipstick cover comprising an outer tubular casing open at one end of transparent plastic material, an inner cylindrical sleeve of fibrous material bonded to said casing, said sleeve having an embossed design upon the surface bonded to said casing and capable of being viewed through said casing.

4. A molded laminated article comprising an outer tubular casing, open at one end, of clear plastic material, and an inner cylindrical sleeve bonded to said casing and capable of being viewed through said casing, said sleeve terminating at a point spaced from the open end of the outer tubular casing with the casing at said open end forming a continuation of said sleeve.

5. A molded laminated article comprising an outer tubular casing, open at one end, of clear plastic material, an inner cylindrical sleeve bonded to said casing, said sleeve having a design upon the surface bonded to said casing capable of being viewed through said casing and terminating at a point spaced from the open end of the outer tubular casing with the inner surface of the casing at said open end forming a continuation of the inner surface of said sleeve.

References Cited by the Examiner

UNITED STATES PATENTS

| | | | |
|---|---|---|---|
| 2,329,375 | 9/1943 | Houlihan | 220—63 |
| 2,333,813 | 11/1943 | Nyden | 206—56 |
| 2,349,799 | 5/1944 | Lee | 206—56 |
| 2,416,962 | 3/1947 | Stather-Dunn et al. | 264—259 |
| 3,050,212 | 8/1962 | Longo | 206—56 |
| 3,149,187 | 9/1964 | Wood | 264—259 |
| 3,152,691 | 10/1964 | Hultgren | 206—42 |

FOREIGN PATENTS

| | | |
|---|---|---|
| 927,706 | 6/1963 | Great Britain. |

LOUIS G. MANCENE, *Primary Examiner.*

THERON E. CONDON, *Examiner.*

G. T. HALL, *Assistant Examiner.*